(12) United States Patent
Yamazaki et al.

(10) Patent No.: US 8,625,174 B2
(45) Date of Patent: Jan. 7, 2014

(54) AUTOMATIC DOCUMENT FEEDER AND IMAGE FORMING APPARATUS

(75) Inventors: Akira Yamazaki, Kanagawa (JP); Hyundeok Ha, Kanagawa (JP); Senggyu Cho, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 93 days.

(21) Appl. No.: 13/438,573

(22) Filed: Apr. 3, 2012

(65) Prior Publication Data

US 2013/0088762 A1    Apr. 11, 2013

(30) Foreign Application Priority Data

Oct. 5, 2011   (JP) ................................. 2011-221373

(51) Int. Cl.
*H04N 1/04*    (2006.01)
(52) U.S. Cl.
USPC ............ 358/498; 358/496; 358/497; 358/474
(58) Field of Classification Search
USPC .................................. 358/498, 497, 496, 474
See application file for complete search history.

(56) References Cited

U.S. PATENT DOCUMENTS 8,064,109 B2 *  11/2011  Misu .............................. 358/496
8,395,827 B2 *   3/2013  Sheng et al. ................... 358/498

FOREIGN PATENT DOCUMENTS

JP        B2-4331668        9/2009

* cited by examiner

*Primary Examiner* — Houshang Safaipour
(74) *Attorney, Agent, or Firm* — Oliff & Berridge, PLC

(57) ABSTRACT

An automatic document feeder includes a transport path member that includes a transport path surface constituting a transport path, and an end portion of which moves in a direction in which it gets away from a feeder body to open the transport path, a support member that is relatively rotatable coaxially with the transport path member, a regulating portion that regulates the relative rotation of the end portion of the transport path member, and an impelling member that impels a portion to be regulated in a direction in which the portion to be regulated contacts the regulating portion, that supports the end portion of the transport path member at a first open position, and that allows the end portion of the transport path member to move to a second open position at which the transport path is opened larger than at the first open position.

4 Claims, 4 Drawing Sheets

AUTOMATIC DOCUMENT FEEDER AND IMAGE FORMING APPARATUS

CROSS-REFERENCE TO RELATED APPLICATIONS

This application is based on and claims priority under 35 USC 119 from Japanese Patent Application No. 2011-221373 filed Oct. 5, 2011.

BACKGROUND

Technical Field

The present invention relates to an automatic document feeder and an image forming apparatus.

SUMMARY

According to an aspect of the invention, there is provided an automatic document feeder including: a transport path member that includes a transport path surface constituting a transport path through which an original document is transported in a feeder body, an end portion of which is rotatably supported by the feeder body, and the other end portion of which moves in a direction in which the other end portion gets away from the feeder body to open the transport path; a support member that is disposed in a wall portion on a side in the rotation shaft direction of the transport path member so as to be relatively rotatable coaxially with the transport path member and that includes a locking portion locked to a locking portion disposed in the feeder body when the transport path is opened; a regulation portion that is formed in the support member and that regulates the relative rotation of the other end portion of the transport path member in a direction in which the other end portion gets close to the feeder body by contacting a portion to be regulated disposed in the wall portion; and an impelling member of which an end is attached to the support member, of which the other end is attached to the other end portion of the transport path member, that impels the portion to be regulated in a direction in which the portion to be regulated contacts the regulating portion, that supports the other end portion of the transport path member at a first open position when the transport path is opened, and that allows the other end portion of the transport path member to move to a second open position at which the transport path is opened larger than at the first open position when a force in the direction in which the other end portion gets away from the feeder body is applied to the other end portion of the transport path member.

BRIEF DESCRIPTION OF THE DRAWINGS

Exemplary embodiments of the present invention will be described in detail based on the following figures, wherein:

FIG. 3 is a diagram schematically illustrating a state where the other end portion of the transport path member of the automatic document feeder according to this exemplary embodiment is supported at a first open position.

DETAILED DESCRIPTION

Figure 1:
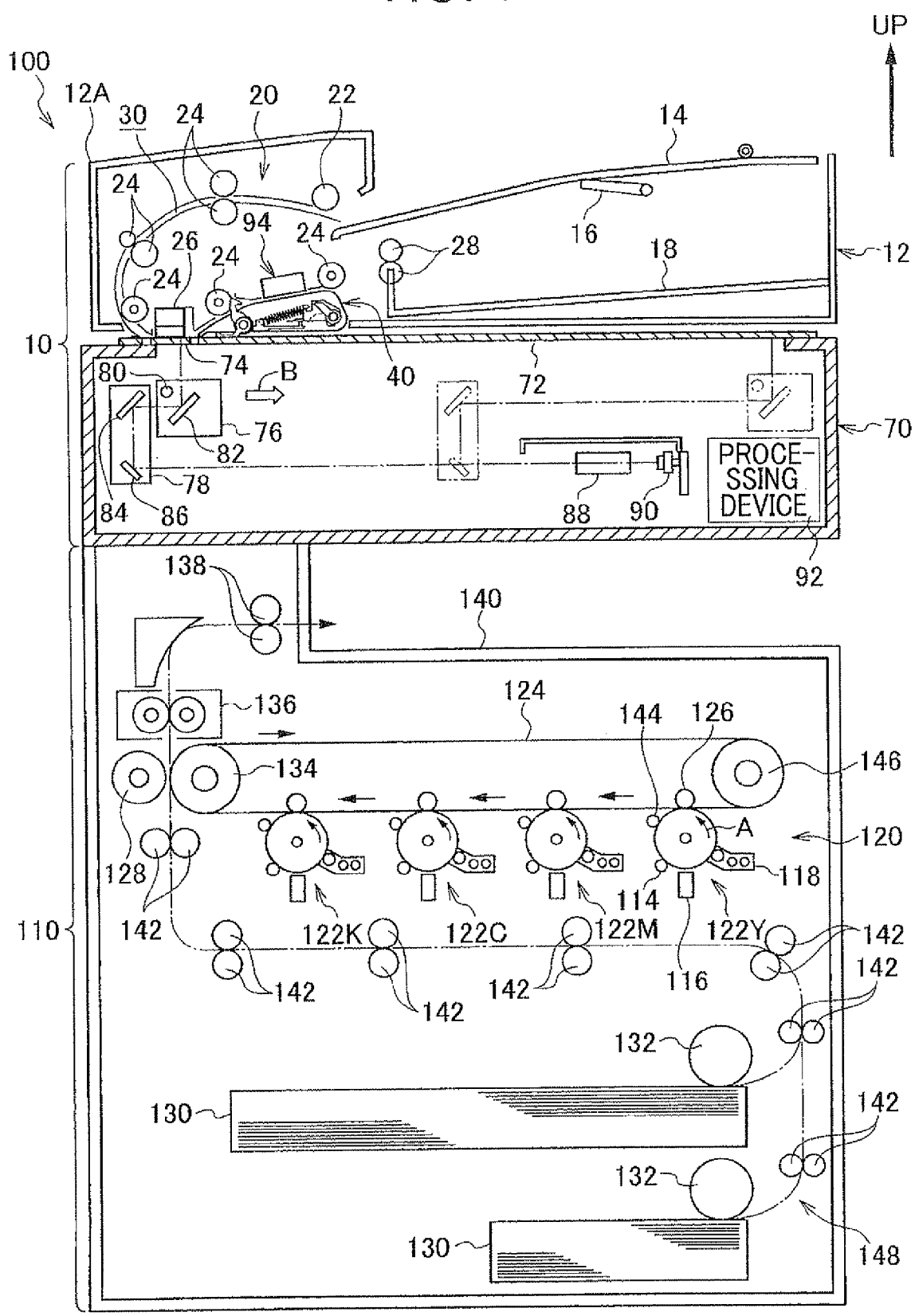
FIG. 1 is a diagram illustrating the configuration of an image forming apparatus including an automatic document feeder according to an exemplary embodiment of the invention.

Hereinafter, an exemplary embodiment of the invention will be described in detail with reference to the accompanying drawings. For the purpose of convenience of explanation, the arrow UP shown in FIG. 1 is defined as an upward direction of an image forming apparatus 100. In the following description, the upward and downward directions are expressed with reference to the state where an automatic document feeder 12 closes a first glass platen 72 and a second glass platen 74. An image forming apparatus 100 according to this exemplary embodiment includes an image recording apparatus 110 recording an image on a recording medium P such as a sheet of paper and an image reading apparatus 10 reading an image of an original document.

The image reading apparatus 10 is disposed in the upper part of the image forming apparatus 100 and serves to read an image of an original document and to convert the read image into an image signal. The image recording apparatus 110 is disposed in the lower part of the image forming apparatus 100 and serves to record an image on a recording medium P on the basis of the image signal converted by the image reading apparatus 10. The configuration of the image recording apparatus 110 will be first described below.

The image recording apparatus 110 includes plural recording medium storage sections 130 storing recording mediums P such as sheets of paper having different sizes, an image forming section 120 forming a toner image on a recording medium P, a transport section 148 transporting a recording medium P to the image forming section 120 from the recording medium storage sections 130, a fixing device 136 fixing the toner image formed by the image forming section 120 to the recording medium P, and a recording medium discharge section 140 to which the recording medium P to which the toner image is fixed by the fixing device 136 is discharged.

The image forming section 120 includes image forming units 122Y, 122M, 122C, and 122K forming color toner images of yellow (Y), magenta (M), cyan (C), and black (K), an intermediate transfer belt 124 as an example of an intermediate transfer member to which the toner images formed by the image forming units 122Y, 122M, 122C, and 122K are transferred, primary transfer rolls 126 as an example of a primary transfer member that transfers the toner images formed by the image forming units 122I, 122M, 122C, and 122K to the intermediate transfer belt 124, and a secondary transfer roll 128 as an example of a secondary transfer member that transfers the toner images transferred to the intermediate transfer belt 124 to a recording medium P.

The image forming units 122Y, 122M, 122C, and 122K each have a photoreceptor drum 112 that rotates in one direction (the direction of arrow A in FIG. 1) as an image supporting member supporting a formed image.

Around each photoreceptor drum 112, a charging device 114 charging the photoreceptor drum 112, an exposing device 116 exposing the charged photoreceptor drum 112 to form an electrostatic latent image on the photoreceptor drum 112, a developing device 118 developing the electrostatic latent image formed on the photoreceptor drum 112 to form a toner image, and a cleaning device 144 removing the toner remaining on the surface of the photoreceptor drum 112 after the toner image is transferred to the intermediate transfer belt 124 are sequentially provided from the upstream side in the rotation direction of the photoreceptor drum 112.

The intermediate transfer belt 124 is supported by a backup roll 134 opposed to the secondary transfer roll 128 and a support roll 146 and circulates in one direction (the clockwise direction in FIG. 1) in contact with the photoreceptor drum 112.

Each primary transfer roll 126 is opposed to the corresponding photoreceptor drum 112 with the intermediate transfer belt 124 interposed therebetween. A primary transfer position at which a toner image formed on the photoreceptor drum 112 is primarily transferred to the intermediate transfer belt 124 is formed between the primary transfer roll 126 and the photoreceptor drum 112.

The secondary transfer roll 128 is opposed to the backup roll 134 with the intermediate transfer belt 124 interposed therebetween. A secondary transfer position at which the toner images primarily transferred to the intermediate transfer belt 124 are secondarily transferred to a recording medium P is formed between the secondary transfer roll 128 and the backup roll 134.

The transport section 148 includes a pickup roll 132 picking up and sending a recording medium P stored in the recording medium storage section 130 and a pair of transport rolls 142 transporting the recording medium P picked up by the pickup roll 132 to the secondary transfer position.

The fixing device 136 is disposed downstream in the transport direction about the secondary transfer position and serves to fix the toner images transferred at the secondary transfer position to the recording medium P. A pair of discharge rolls 138 discharging the recording medium P to the recording medium discharge section 140 is disposed downstream in the transport direction about the fixing device 136.

An image forming operation of forming an image in the image forming apparatus 100 according to this exemplary embodiment will be described below.

In the image recording apparatus 110 according to this exemplary embodiment, when it is intended to form an image on a recording medium P, a recording medium P picked up from the recording medium storage section 130 is first transported to the secondary transfer position by the pair of transport rolls 142.

On the other hand, color toner images formed by the image forming units 122Y, 122M, 122C, and 122K are superimposed on the intermediate transfer belt 124 to form a color image. The color image formed on the intermediate transfer belt 124 is transferred to the recording medium P transported to the secondary transfer position.

The recording medium P to which the toner image is transferred is transported to the fixing device 136 and the transferred toner image is fixed by the fixing device 136. The recording medium P to which the toner image is fixed is discharged to the recording medium discharge section 140 by the pair of discharge rolls 138. In this way, a series of image forming operations is performed.

The configuration of the image recording apparatus 110 is not limited to this configuration, but a direct transfer type image recording apparatus not having an intermediate transfer member, or an inkjet type image recording apparatus, or an image recording apparatus capable of recording an image with a configuration other than the above-mentioned configuration may be employed.

The configuration of the image reading apparatus 10 according to this exemplary embodiment will be described below. The image reading apparatus 10 according to this exemplary embodiment is configured to be able to read both an original document under transport and a stationary original document.

That is, the image reading apparatus 10 includes an automatic document feeder 12 having built therein a front side reading mechanism 70 reading an image on the front side of an original document under transport and an image on the front side of a stationary original document and a back side reading mechanism 94 reading an image on the back side of the original document under transport and a processing device 92 processing an image signal of the image read by the front side reading mechanism 70 or the back side reading mechanism 94.

The front side reading mechanism 70 will be described below. The front side reading mechanism 70 is disposed in the lower part of the image reading apparatus 10. The front side reading mechanism 70 includes a first glass platen 72 as an example of a platform member on which an original document from which an image should be read in a stationary state is placed and a second glass platen 74 as an example of a transmissive member transmitting light applied to the original document under transport.

The front side reading mechanism 70 includes a first moving member 76 and a second moving member 78 which can move along the first glass platen 72. The first moving member 76 is provided with a light-emitting portion 80 emitting light to an original document and a first mirror 82 receiving reflected light reflected by the original document. The second moving member 78 is provided with a second mirror 84 and a third mirror 86 guiding the light acquired from the first mirror 82.

The front side reading mechanism 70 further includes a focusing lens 88 optically reducing the optical image acquired from the third mirror 86 and a CCD (Charge Coupled Device) image sensor 90 photoelectrically converting the optical image focused by the focusing lens 88.

The image signal acquired by the CCD image sensor 90 is sent to the exposing device 116 by the processing device 92.

When it is intended to read an image of an original document placed on the first glass platen 72, the first moving member 76 and the second moving member 78 move in the scanning direction (the direction of arrow B), for example, at a ratio of 2:1. At this time, the light from the light-emitting portion 80 of the first moving member 76 is applied to a surface to be read of the original document and the reflected light from the original document is reflected sequentially by the first mirror 82, the second mirror 84, and the third mirror 86, and is then guided to the focusing lens 88.

The light guided to the focusing lens 88 forms an image on the light-receiving surface of the CCD image sensor 90.

The CCD image sensor 90 is a one-dimensional sensor and simultaneously processes one line.

When the reading of one line in the line direction (the main scanning direction) is ended, the first moving member 76 is made to move in the direction (the sub scanning direction) perpendicular to the main scanning direction and the next line of the original document is read. By repeatedly performing this operation over the entire size of the original document, the reading of a page of the original document is ended.

On the other hand, the original document transported by the automatic document feeder 12 passes over the second glass platen 74. At this time, the first moving member 76 and the second moving member 78 are stopped at the position indicated by the solid line in FIG. 1. The reflected light of the first line of the original document is reflected by the first mirror 82, the second mirror 84, and the third mirror 86, is focused by focusing lens 88, and an image is then read by the CCD image sensor 90.

That is, one line in the main scanning direction is simultaneously processed by the CCD image sensor 90 which is a one-dimensional sensor and then the next line of the original document transported by the automatic document feeder 12 in the main scanning direction is read. That is, by causing the original document to pass through the reading position on the second glass platen 74 after the leading edge of the original document reaches the reading position on the second glass platen 74, the reading of a page of the original document in the sub scanning direction is ended.

Figure 2:
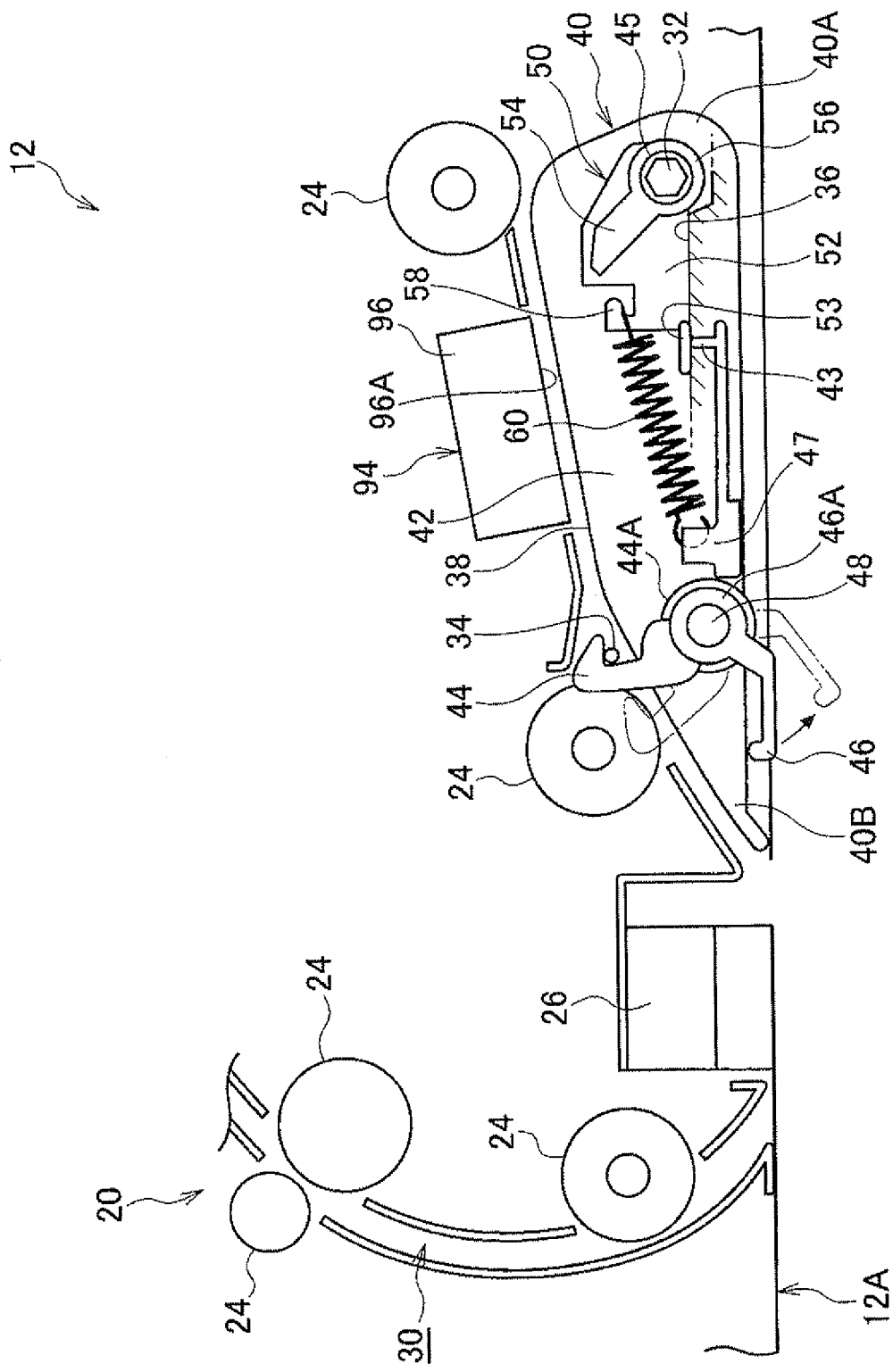
FIG. 2 is a diagram schematically illustrating a state where a transport path member of the automatic document feeder according to this exemplary embodiment is closed.
Figure 3:
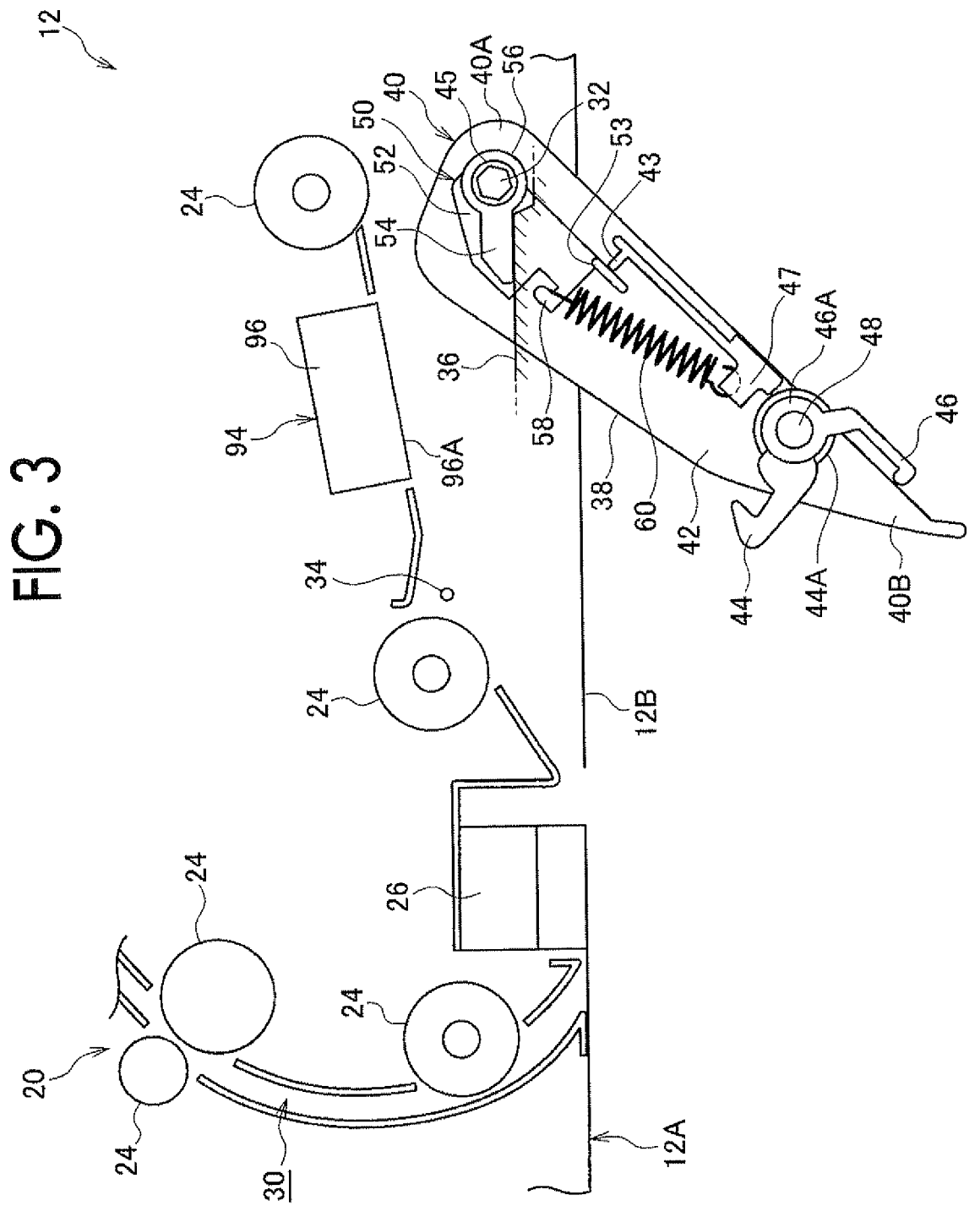
Figure 4:
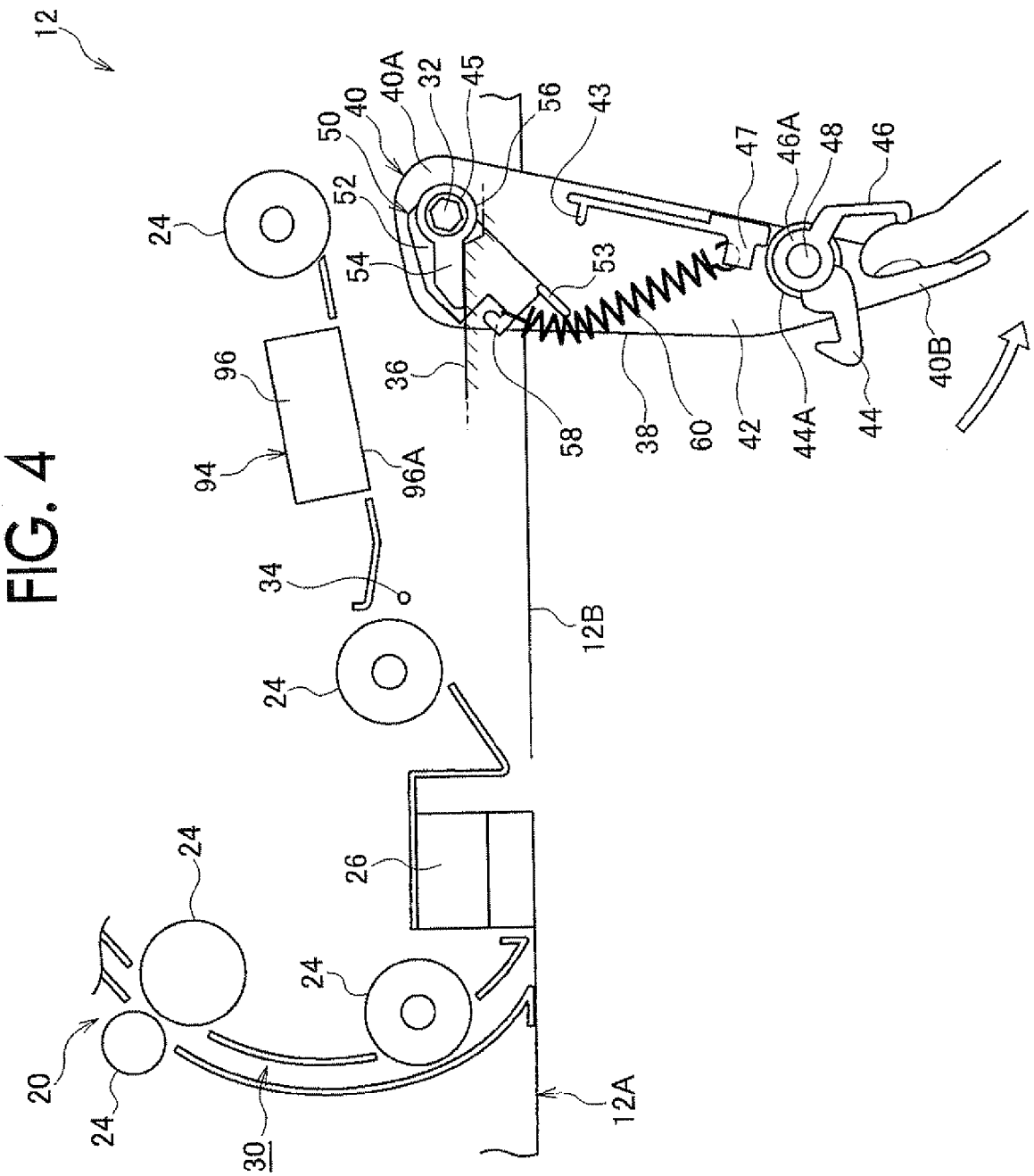
FIG. 4 is a diagram schematically illustrating a state where the other end portion of the transport path member of the automatic document feeder according to this exemplary embodiment is supported at a second open position.

The configuration of the back side reading mechanism 94 will be described below. As shown in FIGS. 2 to 4, the back side reading mechanism 94 is built in the automatic document feeder 12 and includes an image sensor 96 as an example of a reading unit including a reading plane 96A opposing a transport path surface 38 of a transport path member 40 to be described later so as to read an image of (the back side) of an original document. The image sensor 96 optically reads the image of an original document by irradiating the original document with light from a light-emitting portion such as a light-emitting diode and receiving the reflected light by the use of a light-receiving portion.

The configuration of the automatic document feeder 12 will be described below. The automatic document feeder 12 is disposed in the upper part of the image reading apparatus 10 and serves to automatically transport an original document so as to read the original document by the use of the front side reading mechanism 70 and the back side reading mechanism 94. In the automatic document feeder 12, a hinge portion (not shown in the drawings) is disposed on the deep side of the drawing surface of FIG. 1 and the part just close to the drawing surface of FIG. 1 can move vertically about the hinge portion, that is, the first glass platen 72 and the second glass platen 74 can be opened and closed.

As shown in FIG. 1, the automatic document feeder 12 includes a document platform 14 as an example of a document storage section in which an original document can be stored and placed, a transport section 20 transporting the original document placed on the document platform 14 to a document discharge section 18 to be described later, and a document discharge section 18 to which the original document transported through the transport path 30 in the transport section 20 is discharged.

The document platform 14 is provided with a lifting mechanism 16 lifting up and down the document platform 14. The lifting mechanism 16 lifts up the document platform 14 up to the position at which an original document contacts a pickup roll 22 to be described later when the original document is placed on the document platform 14.

The transport section 20 includes a pickup roll 22 picking up an original document from the document platform 14, a transport path 30 through which the original document picked up from the document platform 14 is transported, plural transport rolls 24 transporting the original document along the transport path 30, a counter member 26 opposed to the second glass platen 74 disposed in the transport path 30, and a discharge roll 28 discharging the original document to the document discharge section 18.

A transport path member 40 including a transport path surface 38 constituting a part of the transport path 30 is disposed in the lower part of the automatic document feeder 12 opposed to the first glass platen 72 and the second glass platen 74. As shown in FIGS. 2 and 3, the transport path member 40 has a substantially trapezoidal shape which is flat in a side view and the top surface thereof serves as the transport path surface 38.

In the transport path member 40, one end portion 40A which is on the downstream side (the discharge roll 28 side) in the document transport direction is rotatably supported by the feeder body 12A of the automatic document feeder 12. Specifically, a spindle 32 formed in the feeder body 12A is inserted into a through-hole (not shown) formed in the end portion 40A of the transport path member 40.

Accordingly, the other end portion 40B of the transport path member 40 is supported to be movable in the vertical direction about the spindle 32 and can open a part of the transport path 30 by moving (rotating) downward in the direction in which the other end portion gets away from the feeder body 12A.

In the side wall portions in the rotation shaft direction of the transport path member 40, the side wall portion 42 on the opening side (the side close to the drawing surface of FIG. 1) of the automatic document feeder 12 is provided with a hook member 44 as an example of a locking member and a lever member 46 as an example of an operation member. The hook member 44 and the lever member 46 are attached to the rotation shaft 48 rotatably disposed in the other end portion 40B which is on the upstream side in the document transport direction of the transport path member 40 and rotate together.

Specifically, an annular portion 44A is incorporated into the lower end portion of the hook member 44 and the annular portion 44A is inserted into and fixed to the rotation shaft 48. An annular portion 46A is incorporated into the upper end portion of the lever member 46 and the annular portion 46A is inserted into and fixed to the rotation shaft 48. The hook member 44 is normally impelled in the direction (in the clockwise direction in the drawing) in which it is locked to a locking portion 34 as an example of a portion to be locked disposed in the feeder body 12A by the use of an impelling member such as a torsion spring not shown.

Accordingly, the hook member 44 is normally locked to the locking portion 34 when the transport path 30 shown in FIG. 2 is closed (by the transport path member 40). The hook member rotates in the same direction along with the rotating operation of the lever member 46 in the downward direction (in the counterclockwise direction in the drawing) about the rotation shaft 48, which is indicated by a virtual line in FIG. 2, whereby the hook member is unlocked from the locking portion 34. Accordingly, the locked state (the state where the transport path 30 is closed) of the transport path member 40 is released.

That is, the other end portion 40B of the transport path member 40 can move downward to open the transport path 30. Since the side wall portion (not shown) opposite to the side wall portion 42 of the transport path member 40 is located on the side close to the hinge portion (on the deep side from the drawing surface of FIG. 1) of the automatic document feeder 12 and it is thus difficult to insert a finger thereto, the opposite side wall portion is provided with only a hook member 44 that is normally impelled in the direction in which it is locked to the locking portion 34 and that is unlocked from the locking portion 34 by interlocking with the hook member 44 of the side wall portion 42 with the rotating operation of the lever member 46 and is not provided with the lever member 46.

The side wall portion 42 of the transport path member 40 is provided with a link member 50 as an example of a support member including a portion to be locked 54 which contacts the locking portion 36 of the feeder body 12A to regulate the movement thereof when the other end portion 40B of the transport path member 40 moves downward about the spindle 32.

The link member 50 includes a thin plate-like base portion 52 and a thick plate-like portion to be locked 54 incorporated into the base portion 52 in the thickness direction thereof and can rotate relative to the transport path member 40 coaxially therewith. Specifically, an annular portion 56 is formed at an end portion of the link member 50, and the annular portion 56 is relative-rotatably inserted into a cylindrical boss portion 45 protruding around a through-hole of the transport path member 40.

In the base portion 52 of the link member 50, a hook-like attachment portion 58 is formed at the other end opposite to the annular portion 56. An end of a coil spring 60 as an example of an impelling member is attached to the attachment portion 58 and the other end of the coil spring 60 is attached to an attachment portion 47 disposed in the other end portion 40B in the side wall portion 42 of the transport path member 40, that is, at a position adjacent to the rotation shaft 48.

A protrusion 43 to be described later is normally impelled in the direction (in the clockwise direction in the drawing) in which it contacts a stopper 53 by the coil spring 60. That is, a stopper 53 as an example of a regulating portion protruding in a flat panel shape in the thickness direction is formed in the part just below the attachment portion 58 of the link member 50 (the base portion 52).

A protrusion 43 as an example of a portion to be regulated that is impelled in the clockwise direction in the drawing by the coil spring 60 to contact the stopper 53 is formed in the side wall portion 42 of the transport path member 40. The protrusion 43 is formed in a rib shape coming in vertical contact (linear contact) with the stopper 53, and the relative rotation of the other end portion 40B of the transport path member 40 in the direction in which it gets close to the feeder body 12A is regulated by the protrusion 43.

That is, as shown in FIG. 3, when the other end portion 40B of the transport path member 40 moves downward about the spindle 32 and thus the portion 54 to be locked contacts the locking portion 36 to regulate the position of the link member 50, the protrusion 43 contacts the stopper 53 with the impelling force of the coil spring 60, whereby the movement of the other end portion 40B of the transport path member 40 in the direction in which it gets close to the feeder body 12A is regulated. Accordingly, the other end portion 40B of the transport path member 40 is supported at a first open position.

The operation of the automatic document feeder 12 including the transport path member 40 having the above-mentioned configuration will be described below. When an original document is placed on the document platform 14 to activate the image forming apparatus 100, the original document is transported by the automatic document feeder 12.

That is, the original document on the document platform 14 is picked up and sent to the transport path 30 by the pickup roll 22, the original document picked up and sent to the transport path 30 is transported along the transport path 30 by the plural transport rolls 24, and an image recorded on the front side of the original document is read by the front side reading mechanism 70 while passing over the second glass platen 74.

When it is intended to read an image recorded on the back side of the original document, the image on the back side thereof is read by the back side reading mechanism 94 while transporting the original document over the transport path surface 38. The original document of which at least the image on the front side is read in this way is discharged to the document discharge section 18 by the discharge roll 28.

When the original document stays (a so-called jam occurs) on the transport path surface 38, the part of the automatic document feeder 12 close to the drawing surface is lifted up about the hinge portion on the deep side to expose the lever member 46. The lever member 46 is then operated to rotate downward. Then, a pair of hook members 44 is unlocked from the locking portion 34 of the feeder body 12A, and the other end portion 40B of the transport path member 40 moves downward with its weight about the spindle 32 of the end portion 40A to open the transport path 30 (the transport path surface 38) as shown in FIG. 3.

At this time, the portion 54 to be locked of the link member 50 contacts the locking portion 36 of the feeder body 12A to regulate the downward movement of the other end portion 40B of the transport path member 40. That is, the link member 50 having the portion to be locked 54 locked to the locking portion 36 supports the other end portion 40B of the transport path member 40 by causing the protrusion 43 to contact the stopper 53 by the use of the coil spring 60, that is, with the impelling force of the coil spring 60. Accordingly, the other end portion 40B of the transport path member 40 is supported at the first open position shown in FIG. 3 and the original document staying on the transport path surface 38 can be removed.

When it is difficult to remove the original document at the first open position shown in FIG. 3, the other end portion 40B (for example, the lever member 46) of the transport path member 40 supported at the first open position is pressed with a finger (a force in the opening direction is applied) so as to further move downward (in the counterclockwise direction in the drawing).

Then, since the link member 50 is configured to be rotatable relative to the transport path member 40, the other end portion 40B of the transport path member 40 further moves downward (in the counterclockwise direction in the drawing) against the impelling force of the coil spring 60 (the coil spring 60 expands) in the state where the portion 54 to be locked of the link member 50 is locked to the locking portion 36, as shown in FIG. 4. At this time, the protrusion 43 gets away from the stopper 53.

Accordingly, the other end portion 40B of the transport path member 40 is supported at the second open position at which the opening angle is larger than at the first open position and the transport path 30 is opened larger than at the first open position. Therefore, it is possible to remove the original document staying on the transport path surface 38 more easily than at the first open position. That is, it is possible to improve the maintainability of the automatic document feeder 12.

In this way, when the other end portion 40B of the transport path member 40 can be opened to the second open position, the reading plane 96A of the image sensor 96 of the back side reading mechanism 94 can be exposed to be visible from the direction perpendicular to the opening surface 12B of the feeder body 12A which is opened with the downward movement of the transport path member 40. Accordingly, it is possible to facilitate the cleaning of the reading plane 96A (the maintenance of the image sensor 96) and to further improve the maintainability of the automatic document feeder 12.

That is, when the other end portion 40B of the transport path member 40 can be opened only to the first open position, the reading plane 96A of the image sensor 96 is not visible from the direction perpendicular to the opening surface 12B and it is thus difficult to insert a finger up to the reading plane 96A. However, when the other end portion 40B of the transport path member 40 can be opened to the second open position, it is easy to insert a finger up to the reading plane 96A and it is possible to easily perform the cleaning of the reading plane 96A (the maintenance of the image sensor 96).

When the pressing of a finger on the other end portion 40B (for example, the lever member 46) of the transport path member 40 is released (the force is not applied any more), the other end portion 40B of the transport path member 40 is automatically returned to the first open position at which the protrusion 43 contacts the stopper 53 with the impelling force of the coil spring 60.

When it is intended to close the transport path 30 (the transport path surface 38) by the use of the transport path member 40, the other end portion 40B of the transport path member 40 is manually made to move up. Then, since a pair of hook members 44 is impelled in the direction in which they are normally locked to the locking portion 34, the hook members are automatically locked to the locking portions 34. Accordingly, the transport path 30 is closed.

While the automatic document feeder 12 and the image forming apparatus 100 according to this exemplary embodiment have been described with reference to the accompanying drawings, the automatic document feeder 12 and the image forming apparatus 100 according to this exemplary embodiment are not limited to the configurations shown in the drawing, but may be modified, changed, and improved in various forms.

For example, the link member 50 and the coil spring 60 are not limited to the configuration in which they are disposed in only the side wall portion 42 of the transport path member 40, but may be disposed in the opposite side wall portion thereof. The front side reading mechanism 70 and the back side reading mechanism 94 are not limited to the above-mentioned configuration, but may have other configurations capable of reading an image of an original document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An automatic document feeder comprising:
   a transport path member that includes a transport path surface constituting a transport path through which an original document is transported in a feeder body, an end portion of which is rotatably supported by the feeder body, and the other end portion of which moves in a direction in which the other end portion gets away from the feeder body to open the transport path;
   a support member that is disposed in a wall portion on a side in the rotation shaft direction of the transport path member so as to be relatively rotatable coaxially with the transport path member and that includes a locking portion locked to a locking portion disposed in the feeder body when the transport path is opened;
   a regulating portion that is formed in the support member and that regulates the relative rotation of the other end portion of the transport path member in a direction in which the other end portion gets close to the feeder body by contacting a portion to be regulated disposed in the wall portion; and
   an impelling member of which an end is attached to the support member, of which the other end is attached to the other end portion of the transport path member, that impels the portion to be regulated in a direction in which the portion to be regulated contacts the regulating portion, that supports the other end portion of the transport path member at a first open position when the transport path is opened, and that allows the other end portion of the transport path member to move to a second open position at which the transport path is opened larger than at the first open position when a force in the direction in which the other end portion gets away from the feeder body is applied to the other end portion of the transport path member.

2. The automatic document feeder according to claim 1, further comprising:
   a back side reading mechanism that is disposed in the feeder body so that a reading plane opposed to the transport path surface and used to read the back side of the original document is visible from a direction perpendicular to an open surface of the feeder body when the transport path member moves to the second open position.

3. An image forming apparatus comprising:
   an image reading apparatus including the automatic document feeder according to claim 1 and a front side reading mechanism that reads the front side of an original document fed by the automatic document feeder or an original document placed on a platform member; and
   an image recording apparatus that records an image read by the image reading apparatus on a recording medium.

4. An image forming apparatus comprising:
   an image reading apparatus including the automatic document feeder according to claim 2 and a front side reading mechanism that reads the front side of an original document fed by the automatic document feeder or an original document placed on a platform member; and
   an image recording apparatus that records an image read by the image reading apparatus on a recording medium.

* * * * *